United States Patent [19]
Dover et al.

[11] Patent Number: 5,976,403
[45] Date of Patent: Nov. 2, 1999

[54] ORGANOALKALI COMPOUNDS AND THEIR PREPARATION

[75] Inventors: B. Troy Dover, Kings Mountain; Conrad W. Kamienski; Robert C. Morrison, both of Gastonia; R. Thomas Currin, Jr., Salisbury; James A. Schwindeman, Lincolnton, all of N.C.

[73] Assignee: FMC Corporation, Philadelphia, Pa.

[21] Appl. No.: 09/065,782

[22] Filed: Apr. 23, 1998

Related U.S. Application Data

[60] Division of application No. 08/639,250, Apr. 22, 1996, Pat. No. 5,776,369, which is a continuation-in-part of application No. 08/210,840, Mar. 21, 1994, Pat. No. 5,567,474, which is a continuation-in-part of application No. 08/019,006, Feb. 18, 1993, abandoned.

[51] Int. Cl.⁶ .............................. C09K 3/00; C07F 1/02; C07F 1/04; C07C 31/30
[52] U.S. Cl. ................................ 252/182.3; 260/665 R; 516/35; 516/926; 516/928; 556/410; 568/851
[58] Field of Search .............................. 516/35, 926, 928; 260/665 R; 568/851; 564/469; 556/410; 252/182.3

[56] References Cited

U.S. PATENT DOCUMENTS

| | | | |
|---|---|---|---|
| 2,058,503 | 10/1936 | Rafton et al. | 423/432 |
| 2,394,608 | 2/1946 | Hanley | 516/35 |
| 2,798,831 | 7/1957 | Willcox | 516/35 X |
| 2,799,705 | 7/1957 | De Pree et al. | 260/665 R |
| 3,094,546 | 6/1963 | Towers | 568/851 X |
| 3,274,118 | 9/1966 | Kamienski et al. | 260/665 R X |
| 3,293,313 | 12/1966 | Borkowski | 260/665 R |
| 3,446,860 | 5/1969 | Beumel, Jr. | 260/665 R |
| 4,123,666 | 10/1978 | Chikatsu et al. | 516/35 |
| 5,276,219 | 1/1994 | Schwindeman et al. | 568/851 |
| 5,332,533 | 7/1994 | Schwindeman et al. | 260/665 R |
| 5,567,474 | 10/1996 | Dover et al. | 427/213.3 |
| 5,776,369 | 7/1998 | Dover et al. | 260/665 R X |

FOREIGN PATENT DOCUMENTS

| | | | |
|---|---|---|---|
| 1011136 | 11/1965 | United Kingdom | 260/665 R |
| WO 94/19100 | 9/1994 | WIPO . | |

OTHER PUBLICATIONS

M.M.Markowitz et al.: "Lithium Metal–Gas Reactions," in *J. Chem. Eng.'g. Data.*, vol. 7, No. 4, Oct., 1962, pp. 586–591.

*Primary Examiner*—Richard D. Lovering
*Attorney, Agent, or Firm*—Alston & Bird LLP

[57] ABSTRACT

A process for producing dispersions of atmospherically stable, coated alkali metal particles and atmospherically stable, coated alkali metal powders by agitating a mixture of molten alkali metal in a hydrocarbon oil at dispersion speeds, optionally in the presence of a dispersing agent, contacting the molten alkali metal-hydrocarbon oil dispersion, above or below the surface of the dispersion, with up to 3 weight percent anhydrous carbon dioxide while agitating the dispersion for at least 1 minute. The dispersion in oil can be used directly in chemical reactions. The bulk of the oil can be removed from the dispersions to produce oil wet particles, the oil wet particles car be washed with a low boiling hydrocarbon to produce hydrocarbon wet particles which can be dried to produce atmospherically stable powders of coated metal particles. The dispersed particles in oil, the oil wet particles, the hydrocarbon wet particles and the atmospherically stable powders can each be used in chemical reactions. After washing and drying, the process produces lithium powders having a surface coating composition containing 0.1–0.3 atom percent lithium, 0.3–0.4 atom percent carbon, and 0.3–0.5 atom percent oxygen. The products of the invention may be used to synthesize organometallic compounds, esp. n-butyl lithium and sec-butyl lithium, having low color and low soluble inorganic chloride levels.

12 Claims, No Drawings

ORGANOALKALI COMPOUNDS AND THEIR PREPARATION

CROSS-REFERENCE TO RELATED APPLICATIONS

This application is a division of U.S. patent application Ser. No. 08/639,250, filed Apr. 22, 1996 and now U.S. Pat. No. 5,776,369, which is a continuation-in-part application of U.S. patent application Ser. No. 08/210,840, filed Mar. 21, 1994, now U.S. Pat. No. 5,567,474, which is a continuation-in-part of U.S. patent application Ser. No. 08/019,006, filed Feb. 18, 1993, now abandoned.

This invention concerns a process for preparing novel alkali metal dispersions and metal powders derived therefrom by melting an alkali metal in an inert liquid hydrocarbon oil medium, agitating the molten metal under dispersion conditions to produce a dispersion, contacting the molten dispersion with carbon dioxide. The dispersion can be recovered by traditional means.

Conventional processes prepare alkali metal dispersions by melting the alkali metal in a hydrocarbon oil and then agitating the molten metal in an inert hydrocarbon oil at dispersion speed in an inert atmosphere, usually argon. Dispersing aids, such as silicon oils, hydrocarbon polymers, ethers, alcohols, organic acids, carbon black, organic salts and so forth are used to facilitate rapid dispersion of the molten metal and development of uniform particle size. The finished dispersion is cooled, optionally separated from the hydrocarbon oil by washing the metal with a hydrocarbon solvent of choice and stored under argon. Unless stored under argon or some other inert, protective medium these alkali metal dispersions, when dry, react with the atmosphere under ambient storage conditions and there will be a loss of reactivity and danger of ignition.

An alternative process forces molten alkali metal and argon through a high shear spray nozzle into hexane.

The book "Alkali Metal Dispersions" by Irving Fatt and Marie Tashima, D. Van Nostrand Company, Inc., 1961, contains conventional dispersion process details and lists numerous dispersing aids and equipment. Dispersing equipment which can be utilized to produce the products of this invention is designed to produce a high tangential shear in the alkali metal-hydrocarbon medium mixture and is described in the book by Fatt and Tashima cited above (pp 41–49). Other conventional reaction equipment such as centrifuges or fluid bed reactors do not provide the high tangential shear necessary to produce such metal dispersions and are not recommended.

The present invention provides a process for producing atmospherically stable alkali metal particles comprising heating, in an inert atmosphere, an alkali metal selected from the group consisting of sodium and lithium in a hydrocarbon oil to a temperature above the melting point of the alkali metal, agitating the metal in hydrocarbon oil mixture, under dispersion conditions, which mixture optionally contains a dispersing agent, contacting the molten metal-hydrocarbon oil dispersion mixture, above or below its surface, for at least one minute while the mixture is being agitated under dispersion conditions, with at least 0.3 weight percent of anhydrous carbon dioxide, based on the weight of the alkali metal and cooling the alkali metal dispersion to below the melting point of the alkali metal to produce coated alkali metal particles dispersed in oil.

In accord with the present invention lithium and sodium metal dispersions in hydrocarbon oil are readily prepared by heating, in an inert atmosphere, to above the melting point of the metals, a temperature range of 100 to 240° C., about 100 to 150° C. for sodium and 180 to 240° C. for lithium vigorously agitating the molten metal-hydrocarbon oil mixture under high tangential shear (dynamic conditions) for sufficient time to produce a dispersion or emulsion of the metal into uniform particles or globules in the hydrocarbon oil. Optionally the dispersion can be prepared by vigorous stirring at dispersion speeds in the presence of a dispersing agent, then contacting the dispersed metal with anhydrous carbon dioxide gas while maintaining the high tangential shear stirring at dispersion speeds for a certain period of time, at least about a minute, to provide a predetermined amount of the gas for contact and reaction with the metal. Varying the amount of dispersing agent makes it possible to produce particles having different particle size ranges.

Typical alkali metal dispersing or "emulsifying" devices, in use commercially, employ high tangential shear during agitation according to Fatt and Tashima (p 49). The anhydrous carbon dioxide of this invention is added to the molten metal dispersion mixtures of this invention, while the mixtures are under high tangential shear agitation, until 0.3–5 weight percent carbon dioxide based on alkali metal has been introduced into the mixture. While carbon dioxide is preferably introduced below the surface of the mixture, the vigorous agitation conditions necessary to produce dispersions generally gives adequate contact with carbon dioxide introduced in the gas space above the dispersion mixture. The amount of carbon dioxide introduced should be between 0.3–5 weight percent based on the metal. Higher levels of anhydrous carbon dioxide can be employed but do not appear to provide additional advantages. Some minimum contact time between the anhydrous carbon dioxide and metal is necessary, one minute being adequate, and 1 to 5 minutes a practical reaction period. Although, according to U.S. Ser. No. 08/210,840, U.S Pat. No. 5,567,474 one may prepare these dispersions using anhydrous carbon dioxide alone (no dispersing agent present), better control of the metal particle sizes and their size distribution is obtained if one first disperses the metal in the presence of a suitable dispersing agent, and then afterwards adds the anhydrous carbon dioxide under high tangential shear conditions.

An advantage of the process is that the anhydrous carbon dioxide unexpectedly reacts sufficiently with molten alkali metals, in particulate or very small molten globule form, suspended in a hydrocarbon oil to form a protective, dispersive coating around the metal particles. This is an unexpected result since Markowitz, discussed below, reports that anhydrous $CO_2$ does not react with dry 100–125 sieve lithium metal particles (125–150 microns) up to 250° C. under static conditions and only slightly with wet $CO_2$ under these conditions. We have found no such impedance to the reactivity of anhydrous carbon dioxide with lithium metal under the conditions of the present process. Wet $CO_2$ is not desirable since it generates hydrogen which may react with lithium metal to produce lithium hydride or may be liberated from the vessel as a dangerous gas.

It is another object of this invention to prepare organoalkali compounds, such as organolithium compounds, by utilizing the alkali metal dispersions and alkali metal powders produced by the process of this invention. These organolithium compounds may be alkyllithiums and aryllithiums, lithium dialkylamides, lithium cycloalkylamides, and lithium alkoxides.

Another unexpected advantage of the process is that the large (1–3%) amount of dispersing agent, e.g., oleic acid, ordinarily required to maintain the metal particles at a desired particle size of 10–50 microns, is not required when anhydrous carbon dioxide is added in the process afterwards. Generally, amounts of oleic acid required to achieve this particle size range when $CO_2$ is employed are less than one percent.

On cooling the dispersions produced by this invention to ambient temperature and removing the hydrocarbon oil medium by washing the metal particles with a low boiling hydrocarbon of choice and evaporating said low boiling hydrocarbon under a stream of dry argon, a lithium (or sodium) metal powder is produced. These powders are relatively unreactive to the components of the ambient atmosphere and can be transferred through such ambient atmospheres from one container to another without danger of ignition or loss of chemical reactivity. The alkali metal powders of this invention are unexpectedly reactive to a number of organic compounds. Conventionally produced alkali metal powders exposed to the ambient atmosphere are well known to react quickly with the components of the atmosphere, rapidly losing activity and occasionally igniting.

Although Markowitz, Journal of Chemical and Engineering Data, Vol. 7, No.4, p. 590, states that "lithium carbonate, probably formed by the over-all reaction,

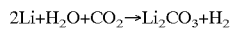

yields a protective coating on the surface of the metal", he was not able to react dry carbon dioxide (no moisture present) with 100–125 sieve (125–150 micron) lithium particles up to a temperature of 250° C. (no indication given that any reaction with $CO_2$ occurs above 250° C.) whereas the present process readily reacts dry $CO_2$ with a molten lithium metal dispersion in hydrocarbon oil at much lower temperatures (190–210° C.). Further, it should be noted that a temperature of 250° C. or higher is not recommended for metal dispersior preparations since generally considerable decomposition of the hydrocarbon oil can occur. In contradistinction to the present process, the lithium metal particles used by Markowitz were previously freed of the mineral oil dispersing medium by washing with hexane and drying in a stream of argon (pp 586–587) before being subjected to contact with dry or wet $CO_2$ (Markowitz obviously carries out this prior washing of the metal particles because he believes that no reaction with the components of the atmosphere, such as $CO_2$, can occur in the presence of a hydrocarbon oil (see page 586, second column) since, before x-ray identification of his lithium metal species he mixes each sample with lithium-treated vaseline, a hydrocarbon oil analog, to prevent atmospheric attack on the lithium metal). Furthermore, this contact of metal particles with $CO_2$ in the Markowitz process took place under static conditions. (It should be noted that, under such static conditions, the lithium metal particles of the Markowitz process will fuse into a solid mass above the melting point of the lithium metal (183° C.), whereas the lithium metal particles of the present process will retain their original size to much higher temperatures (>200° C.).

Markowitz does not speculate on the reactivity of $Li_2CO_3$—coated lithium metal particles with organic substrates nor does he even identify the nature of any coatings on his carbon dioxide-treated lithium metal particles.

The surface coating on the lithium metal powders produced by the process of this invention has been found by X-ray photoelectron spectroscopy (XPS) to consist of 0.19–0.22 atom percent lithium, 0.33–0.39 atom percent carbon and 0.36–0.46 atom percent oxygen. These ranges for the atomic components do not correspond to those for pure lithium carbonate (Li=0.33 at %, C=0.17 at %, O=0.50 at %). D. J. David, M. H. Froning, T. N. Wittberg, W. E. Moddeman, Applications of Surface Science, 7(1981) 181–185, state that the results of the reaction of anhydrous carbon dioxide with fre.,hly cut surfaces of lithium metal at ambient temperature (as determined by Auger Electron Spectroscopy) indicate the surface coating to consist of lithium oxide and lithium carbide, not lithium carbonate. At this point, it is not possible to say, definitively, what is the nature of the compounds comprising the protective surface coating on the alkali metal powders of this invention. Some compositional ranges of these elements on the surface of the lithium metal powders of this invention are 0.1–0.3 atom percent lithium, 0.3–0.4 atom percent carbon and 0.3–0.5 atom percent oxygen.

The process of this invention produces alkali metal dispersions having metal particle sizes in the range of 10 to 300 microns, and even larger sized metal particle powders (to 1000 microns) can easily be produced. On cooling, the resulting alkali metal dispersions of this invention are readily filtered to remove the bulk of the dispersant hydrocarbon oil and the metal is them washed with hexane to remove residual oil, after which the metal powder is dried. The process can be controlled to produce various particle size ranges, such as 10 to 50 microns, 10 to 300 microns, 50 to 400 microns, 10 to 1000 microns, and so forth. Surprisingly, the resulting dried metal powders ("Dry Pack") are unexpectedly stable to ambient atmosphere for periods up to about an hour allowing their safe transfer in such atmospheres from one container to another. The lithium and sodium powders of this invention have been found to be non-pyrophoric by standard pyrophoricity tests.

Lithium metal particle sizes in the inventive dispersions, prepared in the hydrocarbon oil of choice, can be varied by adjusting the amount of dispersing agent (oleic acid) employed, as shown in the tables below.

| Lot no. | O.A.(%) | $CO_2$(%) | Particle Range | Av. Particle Size |
|---------|---------|-----------|----------------|-------------------|
| 10216   | 0.450   | 1.5       | 5–60           | 30                |
| 10009   | 0.346   | 1.5       | 10–300         | 80                |
| 10005   | 0.184   | 1.5       | 100–300        | 150               |
| 10027   | 0.171   | 1.7       | 50–700         | 300               |
| 10043   | 0.151   | 2.0       | 400–2000       | 1000              |

Notes: (a) Particle ranges and sizes in microns
(b) O.A. = Oleic acid (commercial grade)
(c) (%) of O.A. and $CO_2$ based on lithium metal.

It was found that the use of 0.368% oleic acid alone, i.e., in the absence of $CO_2$, resulted in agglomeration of the metal in the particular low viscosity hydrocarbon oil of choice under the particular dispersion conditions employed above. Generally, at least about one percent oleic acid is required to produce a satisfactory dispersion with particle sizes under 100 microns in size. The use of $CO_2$ alone, i.e., no oleic acid present, gave a somewhat broader range of particle sizes and did not allow for any significant variation in the particle size range, as seen in Tables 3 and 4 (compare to above table). Of course, carbon dioxide can be employed with conventional dispersing agents such as oleic acid and generally, one may employ considerably less oleic acid when using $CO_2$.

Sodium metal, incorporated in the lithium must be kept below the alloy composition, i.e., below 0.88 wt %, in order to prevent thickening or gellation of the dispersion mass during the preparation of conventional lithium dispersions e.g., using oleic acid alone. However, with the substitution of carbon dioxide for part or all of the oleic acid, there is no practical upper limit for sodium incorporation. For example, Table 2 shows a 5 weight sodium incorporation, based on lithium, which has no tendency to thicken.

A variety of hydrocarbon oils may be used successfully in the present invention. The term hydrocarbon oil, as used herein, includes various oily liquids consisting chiefly or wholly of mixtures of hydrocarbons and includes mineral oils, i.e., liquid products of mineral origin having viscosity limits recognized for oils and hence includes but is not limited to petroleum, shale oils, paraffin oils and the like. There are many manufacturers of these useful hydrocarbon oils. Among these useful hydrocarbon oils are white oils (highly refined), such as, e.g. hydrocarbon oils like Peneteck, manufactured by Penreco Division of Pennzoil Products Inc., which has a viscosity in the range of 43–59 pascal-sec at 100° F. and a flash point of 265° F. (129° C.), Parol 100, which has a viscosity of 213–236 pascal-sec at 100° F. and a flash point of 360° F. 182° C.) and Carnation white oil (viscosity=133–165 pascal-sec at 100° F.; flash pt=177° C.) made by Sonneborn Div. of Witco. Even certain purified hydrocarbon solvents which boil in a range encompassing the melting point of lithium or sodium metal may be used, such as UNOCAL's 140 Solvent (b.p. range= 190–203° C.). In addition, unrefined oils, such as Unocal's 460 Solvent (b.p. range 189–262° C.), Hydrocarbon Seal oil (b.p. 270–321° C.) and Exxon's Telura 401 (b.p. 174–322° C.) and Telura 407 (b.p. 245–450° C.) may also be used.

Solvents useful in the practice of this invention include aliphatics, especially lower alkanes containing 5 to 10 carbon atoms, aromatics containing 6 to 10 carbon atoms and mixtures thereof including petroleum ether and other commercially available mixtures of hydrocarbons having rather narrow boiling ranges.

Coated lithium particles of this invention can also be prepared by spraying (using a high shear nozzle) molten alkali metal into a carbon dioxide atmosphere, as into a container having a carbon dioxide atmosphere, and collecting the particles in a solvent such as hexane. to The metal powders of this invention can be dried and packaged in suitable containers under an inert atmosphere, such as argon ("Dry PAck"). The powders can easily be introduced into commercial or laboratory reactions as dry powders or slurried in an inert solvent and introduced into the reaction as a slurry. The dispersions are of course useful in chemical reactions as dispersions in oil, as oil wet particles after filtering to remove the bulk of the oil, or solvent wet particles obtained by washing the oil wet particles with a suitable hydrocarbon solvent to produce solvent wet particles.

It was further unexpectedly found that the coating on the alkali metal particles produced by the process of this invention did not retard the reactivity of the metal with alkyl halides, but did protect the alkali metal from reaction with the ambient atmosphere. It was found that n-butyllithium could be prepared in an 82% yield from such a lithium powder that had been exposed to an ambient atmosphere for a 1 hour period One might conjecture that a such a protective coating would prevent reactions with such organic substrates from occurring since much smaller molecules, such as oxygen and nitrogen, do not react readily with the coated powders. However, it was found that a normally produced lithium powder (no $CO_2$), when exposed to the ambient atmosphere for one hour and then reacted with n-butyl chloride, resulted in only a 39% yield of n-butyllithium. This is an unexpected advantage of producing alkali metal dispersions and powders by the process of this invention since, as here indicated, reaction with the ambient atmosphere lessens the degree of reactivity of alkali metal dispersions, produced by conventional means, with alkyl halides.

Thus, the lithium dispersions and dried lithium powders of this invention unexpectedly have been found to be capable of forming a variety of organolithium products in good yields from corresponding organic chlorides and organoamines. Among these organolithiums are n-, sec-, iso- and tert-butyllithiums, phenyllithium, n-hexyllithium, and 2-ethylhexyllithium. Even lithium dialkylamides such as lithium diisopropylamide could be prepared by metalation of the corresponding dialkylamines (see Table 1). Other organic compounds are also capable of reacting with the metal powders of this invention, such as e.g., alcohols, esters, aldehydes and ketones.

Lithium powder, generated by the process of this invention, protected from ambient conditions and stored under argon for 30 days, produced high (90–95%) yields of n- and sec-butyllithium in hydrocarbon solutions and such n- and sec-butyllithium possessed remarkably low color, platinum-cobalt colors (APHA) of <25 to <100. Tables 1 and 2 list a number of organolithium compounds prepared from the lithium dispersions and powders of this invention and their yields, chloride content, and color. The Pt/Co colors of <25 to <100 are to be compared to typical values of Pt/Co values of 150–250 for typical production run n-butyllithium. The color of the products having colors of <25 upon concentration to 97 weight % by removing most of the hexane only had a color of 50 Pt/Co.

An additional advantage in the use of carbon dioxide coated lithium metal powders is the striking effect on the chloride content of the organolithium solutions in hydrocarbon solvent media (prepared from organic chlorides) when using the lithium metal dispersions prepared by the process of the invention. The values for the soluble inorganic chloride in these solutions are substantially lower then produced by a conventional lithium dispersion. The soluble inorganic chloride from the present invention varies from <100 to <1000 ppm, depending on whether n-butyllithium or s-butyllithium is being made and the concentration of the alkyllithium solution. The same products produced from lithium metal dispersions that do not contain a coating composition of this invention are higher, in the range of 300 ppm and higher. Lower chloride levels are associated with clearer product alkyllithium solutions which have enhanced marketability (see Table 2).

The following examples further illustrate the invention.

EXAMPLE 1

LITHIUM DISPERSION IN PENETECK WHITE HYDROCARBON OIL USING CARBON DIOXIDE (SURFACE FEED) AS DISPERSING AGENT

Experiment No. 7285

Lithium metal 300 g of low sodium grade was charged to a 3 liter stainless steel resin flask reactor with a 4" (10.16 cm) top fitted with a stirring shaft connected to a fixed high speed stirrer motor with a flexible shaft and top and bottom heating mantles in a dry atmosphere room under argon. The reactor was then assembled and 2.25 g of sodium metal and 90% g of Peneteck* hydrocarbon oil were added. Peneteck hydrocarbon oil is a product of Penreco Division of Pennzoil Products Co. The reactor was then heated to 200° C., until the lithium and sodium metals became molten. Stirring was maintained gently and intermittently until all the metal was completely molten. Then the mixture was stirred at high speed (10,000 rpm) for 5 minutes. Carbon dioxide, 7.74 g, was charged, surface fed over a 4 minute period while continuing high speed stirring. The high speed stirring incorporated the carbon dioxide into the metal-hydrocarbon mixture. When the carbon dioxide was all added the stirring was stopped, heating mantles removed and the reactor cooled to about 65° C. before bottling the product dispersion. The metal particle size range was found to be 10–200 microns.

Details of further examples using the procedure of this example are given in Tables 3 and 4.

COMPARATIVE EXAMPLE USING OLEIC ACID AND CARBON DIOXIDE

Experiment No. 10009

A weight of 12.7 pounds of lithium metal, 0.033 pounds of sodium metal and 34 pounds of Peneteck oil were charged to a 15 gallon stainless steel reactor. The mixture was heated to about 190° C. and held there until all of the metal became molten. Intermittent stirring was employed to speed the melting process. High speed shear stirring was begun when the metal became completely molten and sustained for two minutes. The stirring rate was then slowed, 20 grams of oleic acid added, and high speed stirring continued for an additional 2 minutes before starting $CO_2$ addition. A total of 85 grams of $CO_2$ was added over a 5 minute period, the temperature rising about 30 degrees. When $CO_2$ addition was complete, stirring was discontinued, the heating source removed, and cooling applied. When the temperature reached 150° C. gentle stirring was begun and the temperature lowered to 50° C. before pumping the dispersion out of the vessel. A photomicrograph of the dispersion showed a metal particle range of 10 to 300 microns, with an average particle size less than 100 microns.

EXAMPLE 2

PREPARATION OF DRY LITHIUM POWDER

Experiment No. 7222

Lithium dispersion (lot 7218) prepared as in Example 1 above was filtered and washed in an enclosed, sintered glass filter funnel (fine porosity) to remove the hydrocarbon oil medium. Filtration to remove the bulk of the oil occurred rapidly, as did the subsequent hexane washings (3). Finally, the lithium metal residue in the funnel was washed once with n-pentane, filtered, and the funnel heated with a heat gun to remove traces of solvents. The resulting free-flowing powder was transferred from the funnel to a tightly capped storage bottle.

A pyropnoricity test [Code of Federal Regulations 49—Transportation Section 173.125 and Appendix E (CFR 49)] carried out on this material showed it to be non-pyrophoric. An exposure test (Experiment #7231) carried out on a sample of this dry powder placed on a watch glass and exposed to ambient air conditions; no heat was generated on exposure to the air nor did any color change occur within 8 hours as occurs with normally prepared lithium dispersion powders. There was no odor of ammonia, either, as normally occurs due to nitridation of the metal.

EXAMPLE 3

PREPARATION OF n-BUTYLLITHIUM IN HEXANE USING CARBON DIOXIDE DISPERSED LITHIUM METAL POWDER PREVIOUSLY EXPOSED TO AMBIENT AIR

Experiment No. 7271

A lithium metal dispersion in Peneteck hydrocarbon oil prepared as in Example 1 with carbon dioxide (#7218) was filtered and the metal washed 3 times with hexane, once with n-pentane, and blown dry. A 9.0 gram (1.30 moles) portion of this metal powder was placed in an open Petri dish and exposed to ambient air (80% relative humidity) for approximately one hour. It was then transferred to a reaction flask along with 164 mls of hexane and 5 ml. of a 15 wt % n-butyllithium in hexane conditioner and stirred for about 20 min. before starting a feed of 54.6 g (0.584 moles) of n-butyl chloride. The reaction proceeded well and, after 2 hours of post addition stirring, was filtered from the by-product lithium chloride and the latter washed three times with a total of 120 mls of hexane. The filtrations proceeded rapidly to give a water white, clear solution of a 15 wt % solution of n-butyllithium in hexane (82.3% yield based on n-butyl chloride). This experiment showed that there was a protective coating on the lithium metal powder sufficient to prevent any significant loss of lithium metal during transfer of the powder in air.

EXAMPLE 4

LITHIUM DISPERSION IN PENETECK WHITE HYDROCARBON OIL USING CARBON DIOXIDE AS DISPERSING AGENT— SUBSURFACE FEED

Experiment No. 7505

The reactor and apparatus consisted of a 3 liter stainless steel round bottom flask with 4" (10.16 cm) opening, a 4" (10.16 cm) head with stirring shaft fixed therein, and connected to a high speed stirrer motor via a flexible shaft and a fixed argon inlet and a stainless steel sintered sparger disc and top and bottom heating mantles. The sparger disc (2 ½" [6.35 cm] biscuit type) was fixed directly below the cutting blade of the stirring shaft and was approximately ¾" (1.8 cm) off the bottom of reactor.

Lithium metal (350.0 grams) was charged to the reactor in the dry atmosphere room. The reactor was assembled and 2.625 g of sodium and Peneteck hydrocarbon oil were added. The reactor was then heated to about 200° C. and the contents stirred gently until all metal was molten (approx. 30 minutes). Metal and oil were then stirred at high speed (10,000 rpm) for 4 minutes, then carbon dioxide was fed in through the sparger for a period of 2 minutes. Temperature of the reaction rose 11° C. (from 191–202° C.) when the carbon dioxide was charged. At end of the carbon dioxide feed, stirring was stopped, the heating mantle was removed and the dispersion cooled to about 65° C. before transferring to tightly capped storage bottles.

EXAMPLE 5

SECONDARY BUTYLLITHIUM IN CYCLOHEXANE VIA CARBON DIOXIDE DISPERSED LITHIUM METAL

Experiment No. 7506

The reactor and apparatus consisted of a 500 ml, 3 necked Morton flask, a Claiseni adapter, 125 ml dropping funnel, a stirring shaft with TEFLON (R.) blade, stirring motor, and a thermometer probe with an electronic read out.

Lithium metal dispersion (prepared as in Example 1) was hexane washed two times and pentane washed twice and dried with argon. The metal was then weighed and the experiment conducted using 10% excess lithium (14.42 g or 2.078 moles) and 395 milliliters of cyclohexane solvent.

Cyclohexane was used to transfer the lithium through a transfer tube to the reactor. Conditioner, 5 ml s-butyllithium in cyclohexane, was added and the mixture stirred for 15–30 minutes. One to three mls of sec-butyl chloride was added which raised the temperature from ambient to around 34° C.

When the temperature began to drop, a slow s- butyl chloride feed was started. The sec-butyl chloride was fed over one hour and forty-five minutes adding a total of 87.4 g (0.944 moles) and the reaction temperature was maintained between 32–37° C. The reaction was stirred for 1.5 hours, then filtered through a 500 ml medium fritted filter using inert diatomaceous earth filter aid. The solution filtered very fast (less than 5 minutes).

The final solution yield was 89.3%, C-bound lithium was 98.2% with less than 10 ppm soluble inorganic chloride ion in solution.

Further examples are given in Table 4.

EXAMPLE 6

SODIUM DISPERSION IN PENETECK HYDROCARBON OIL USING CARBON DIOXIDE AS DISPERSING AGENT

Experiment No. 7511

Into a 500 ml Morton flask fitted with a high speed stirrer and gas inlet tube was placed 60 grams of sodium metal and 140 grams of Peneteck hydrocarbon oil. The contents of the flask were heated to 108° C. and stirred until all of the metal became molten. The mixture was then stirred at high speed (10,000 rpm) for 3–4 min. and the carbon dioxide gas feed begun. A total of 1.0 grams of carbon dioxide (1.7 wt % based on the metal) gas was fed into the mixture. The temperature of the reaction rose 3° C. within the first few seconds of the feed and then held constant for the remainder of the feed. Then, stirring was discontinued and the mixture cooled to room temperature. Part of the resulting dispersion was washed with hexane and pentane, then blown dry with argon to convert it to a dry, free-flowing powder. A small portion of the dry powder was placed on a watch glass in the hood. It did not ignite. It took approximately 10–15 min. before the powder turned white. The CFR 49 pyrophoricity solid test was negative. A photomicrograph of the solid dispersion showed particle sizes in the 1 to 200 micron range with most in the 50–100 micron range.

EXAMPLE 7

PREPARATION OF n-BUTYLLITHIUM IN HEXANE VIA CARBON DIOXIDE DISPERSED LITHIUM METAL

Experiment No. 7851

The reactor and apparatus was as described in Example 5, plus heating mantle, and reflux condenser.

The lithium metal dispersion prepared as in Example 1 was hexane washed twice and pentane washed once and dried with argon. The metal was then weighed, 12.10 g (1.743 moles).

Hexane, 310 milliliters, was used to transfer the lithium through a transfer tube to the reactor. The hexane-lithium mixture was heated to reflux (dry ice/liexane in condenser) and dropwise feed of n-butyl chloride begun. The reaction proceeded instantaneously (refluxing) and the source of heat was removed. Then 73.4 g of n-butyl chloride (0.7924 moles) was fed in over a 40) minute period, the reaction heat controlled strictly by the rate of reflux. The reaction mixture was allowed to cool to ambient (stirring) over a 2.5 hour period. The mixture was filtered and the lithium chloride residue washed three times with hexane (50 ml each) over a 25–30 minute period. The combined filtrate and washings weighed 256.4 grams. A sample of the clear, water white (Pt/Co=<25 water white solution) product solution was assayed for total contained alkalinity and found to contain 2.94 meq/gram of solution 18.83 wt% n- butyllithium. The yield of n-butyllithium was 95.2%. Removal of the hexane solvent under vacuum gave a 97 wt % product which was clear and yellow in color (Pt/Co=50 ASTM=D1209). Further examples are given in Table 4.

The above results can be compared to a similar run using a lithium dispersion prepared with oleic acid alone as a dispersant (experiment number 7813) where the resulting product solution was yellow (Pt/Co=175) and the concentrated product (97%) was yellow (Pt/CO=300) and the yield was 94.7%.

From the foregoing disclosure and examples it is evident that it is possible, according to the invention, to produce a stable alkali metal powder formed by heating an alkali metal in a hydrocarbon oil to a temperature above the melting point of the alkali metal, agitating the the molten alkali metal, maintaining agitation under conditions sufficient to disperse the alkali metal into small molten particles while contacting the alkali metal with at least 0.3 weight percent of anhydrous carbon dioxide for at least one minute to disperse the molten alkali metal and recovering a stable coated alkali metal powder having particle sizes in the range of 10 to 1000 microns in the form of a dry powder.

TABLE 1

USES OF LITHIUM DISPERSION MADE WITH CARBON DIOXIDE STABILIZER

| Lot No. | RLi | Init. Agent | % Yield | Remarks |
|---|---|---|---|---|
| 7224 | n-Butyl | none | 94 | Dry pack day 1 |
| 7231 | n-Butyl | none | 90 | Dry pack day 6 |
| 7253 | n-Butyl | none | 91 | Dry pack day 32 |
| 7261 | s-Butyl | none | 92 | Dry pack day 1 |
| 7262 | s-Butyl | none | 90 | Dry pack day 35 |
| 7292 | 2-Et Hexyl (heptane) | none | 42 | (a) |
| 7230 | t-Butyl (pentane) | 1 g sand per g Li | 73 | (b) |
| 7302 | Phenyl (DBE) | IPA | 94 | (c) |
| 7309 | LDA | none | 97 | (d) |
| 7288 | n-Hexyl | none | 88 | |

(a) Lithium dispersion prepared with oleic acid as dispersant did not initiate in heptane.
(b) Lithium dispersion prepared with oleic acid as dispersant gave an 80% yield.
(c) Run did not initiate on its own
(d) Reaction gave results equivalent to that using lithium dispersion prepared from oleic acid.
DBE dibutyl ether
IPA 2-propanol
LDA Lithium diisopropylamide

TABLE 2

Effect of Carbon Dioxide Dispersed Lithium on Final Chloride Content of RLi in Hydrocarbon Solution

| Run No. | Alkyllithium | Li Dispersant (W%) | Yield % | Soluble Inorg. Cl. (ppm) | Color (Pt/Co) |
|---|---|---|---|---|---|
| 7506 | SBL(1) | CO2 (0.9) | 89 | <10 | <25 |
| 7515 | SBL | CO2/5% Na | 88 | <11 | <25 |
| 7523 | SBL | CO2 (1.3) | 87 | 33 | <25 |
| 7525 | SBL | CO2 (2.6) | 89 | 41 | <25 |
| 7526 | SBL | CO2 (3.9) | 84 | 46 | <25 |
| 7527 | NBL(2) | CO2 (1.4) | 89 | 87 | <25 |
| 7529 | NBL | CO2 (0.9) | 90 | 126 | <25 |
| 7530 | NBL | CO2/5% Na | 83 | 58 | <25 |
| 7551 | NBL | CO2 (3.2) | 87 | 193 | <25 |
| — | NBL | Oleic Acid (1.0) | — | 300(3) | 175 |

(1) Cyclohexane solvent
(2) Hexane solvent
(3) Typical value
SBL secondary butyllithium
NBL normal butyllithium

TABLE 3

LITHIUM/CO2 DISPERSIONS IN PENETECK OIL

| EXPERIMENT NO. | REACTOR SIZE | PRE-CUT TIME (Min) | CO2 % (WT)* | CO2 FEED TIME (Min) | PARTICLE SIZE (Microns) |
|---|---|---|---|---|---|
| 7174 | 500 ml 18 g Li | 3 | — | start to finish | 10–200 |
| 7179 | 500 ml 30 g Li | 3 | 5.2 | 2 | 20–300 |
| 7187 | 500 ml 30 g Li | 3 | 3.0 | 1 | 20–300 |
| 7218 | 3 l. 355 g Li | 4 | 1.8 | 3 | 10–200 |
| 7283 | 3 l. 300 g Li | 10 | 1.0 | 1 | 10–500 |
| 7285 | 3 l. 300 g Li | 5 | 2.0 | 4 | 10–200 |
| 7290 | 3 l. 300 g Li | 5 | 3.0 | 6 | 10–500 |
| 7291 | 500 ml 30 g Li | 9 | 1.0 | 0.5 | 20–300 |

*Surface feed

TABLE 4

CO2/LITHIUM DISPERSIONS IN PENETECK OIL

| | Dispersions | | | | | | Alkylithiums | | | Filter Rate |
|---|---|---|---|---|---|---|---|---|---|---|
| Run No. | % CO2 | CO2 g/min | CO2 Time (min.) | T (° C.) (feed) | Particle Size | Comments | Run No. | Type | Yield | ml/min |
| | | | | | SURFACE FEED | | | | | |
| 7283 | 1.29 | 3.87 | 1 | 11 | <200 | | 7523 | SBL | 87.8 | 100 |
| 7469 | 2.20 | 2.16 | 3 | 13 | 20–300 | | 7470 | SBL | 86.5 | 33 |
| 7285 | 2.58 | 1.94 | 4 | — | 20–300 | | 7525 | SBL | 89.6 | 250 |
| 7430 | 3.16 | 5.16 | 2 | 68 | 50–100 | irregular shape | 7432 | SBL | didn't initiate | — |
| | | | | | | | 7445 | NBL | 89.3 | 63 |
| 7414[1] | 3.87 | 5.60 | 0.25 | 20 | 50–200 | irregular shape | 7428 | NBL | 89.2 | 3.3 |
| 7290 | 3.87 | 1.93 | 6 | 12 | 50–300 | round shape | 7526 | SBL | 84.2 | >100 |
| | | | | | SUBSURFACE FEED | | | | | |
| 7505 | 0.94 | 1.65 | 2 | 11 | <250 | | 7506 | SBL | 89.3 | 100 |
| 7513 | 1.01 | 1.52 | 2 | 9 | >200 | large | 7515 | SBL | 88.5 | 100 |
| 7497 | 1.41 | 1.65 | 3 | 13 | <150 | | 7500 | SBL | 87.8 | 100 |
| plant | — | — | — | — | <50 | | 7473 | SBL | 89.5 | 100 |

[1] 0.5 Liter run

We claim:

1. A process of preparing organoalkali compounds, the process comprising reacting atmospherically stable alkali metal particles with an organic compound selected from the group consisting of organic halides, organic amines and organic alcohols, said atmospherically stable alkali metal particles being produced by heating an alkali metal in a hydrocarbon oil to above the melting point of the alkali metal, agitating the mixture under high shear mixing conditions, optionally in the presence of a dispersing agent, contacting the molten dispersion, above or below its surface, with at least 0.3 weight percent of anhydrous carbon dioxide based on the weight of alkali metal, cooling the dispersion to below the melting point of the metal, filtering to remove the bulk of the hydrocarbon oil to produce alkali metal particles while wet with oil.

2. The process of claim 1 wherein the production of said atmospherically stable alkali metal particles further comprises washing the alkali metal particles that are wet with oil with a low boiling liquid hydrocarbon to produce hydrocarbon wet alkali metal particles, and optionally drying the particles.

3. A process of preparing organolithium compounds, comprising reacting atmospherically stable alkali metal powders having particle sizes between 10 and 1000 microns and having a atmospherically protective surface coating composition comprising 0.1 to 0.3 atom percent lithium, 0.3 to 0.4 atom percent carbon, and 0.3 to 0.5 atom percent oxygen with an organic compound selected from the group consisting of organic halides, organic amines and organic alcohols.

4. The process of claim 3 wherein the alkali metal particles are particles of lithium.

5. The process of claim 3 wherein the organic halides are selected from the group consisting of alkyl chlorides and aryl chlorides.

6. The process of claim 5 wherein the alkyl chlorides are selected from the group consisting of n-butyl chloride, sec -butyl chloride, isobutyl chloride, t-butyl chloride, hexyl chloride and octyl chloride and the aryl chloride is chlorobenzene.

7. The process of claim 3 wherein the organic amines are selected from the group consisting of primary and secondary amines.

8. The process of claim 7 wherein the secondary amines are selected from the group consisting of diisopropylamine, hexamethyleneimine, and hexamethyldisilazane.

9. The process of claim 3 wherein the organic alcohols are selected from the group consisting of isopropyl alcohol, tert-butyl, and 2-methoxyethanol.

10. A normal-butyllithium composition comprising at least 90 weight percent normal-butyllithium, 1 to 10 weight percent hydrocarbon solvent and having a Pt/Co color of <100 and insoluble inorganic chloride content of <1000 parts per million.

11. A normal-butyllithium composition comprising at least 10 weight percent normal-butyllithium, 1 to 90 weight percent hydrocarbon solvent and having a Pt/Co color of <25 and insoluble inorganic chloride content of <200 parts per million.

12. A secondary-butyllithium composition comprising at least 10 weight percent secondary-butyllithium, 1 to 90 weight percent hydrocarbon solvent and having a Pt/Co color of <25 and insoluble inorganic chloride content of <100 parts per million.

* * * * *

UNITED STATES PATENT AND TRADEMARK OFFICE
CERTIFICATE OF CORRECTION

PATENT NO. : 5,976,403

DATED : November 2, 1999

INVENTOR(S) : Dover et al.

It is certified that error appears in the above-identified patent and that said Letters Patent is hereby corrected as shown below:

Title page, [56] References Cited, U.S. PATENT DOCUMENTS, line 2, "Hanley" should read --Hansley--; line 9, "10/1978" should read --1/1979--.

Title page, [57] Abstract, line 12, "car" should read --can--.

Columns 11-12, Table 3, 2nd column, lines 7, 9, 11 & 13, "3 1.", each occurrence, should read --31.--.

Signed and Sealed this

Sixth Day of June, 2000

*Attest:*

Q. TODD DICKINSON

*Attesting Officer*   *Director of Patents and Trademarks*